US012658847B2

(12) United States Patent
Perret

(10) Patent No.: US 12,658,847 B2
(45) Date of Patent: Jun. 16, 2026

(54) MODULAR PHOTOVOLTAIC SYSTEM

(71) Applicant: Planair SA, La Sagne (CH)

(72) Inventor: Lionel Perret, Neuchâtel (CH)

(73) Assignee: Planair SA, La Sagne (CH)

( * ) Notice: Subject to any disclaimer, the term of this patent is extended or adjusted under 35 U.S.C. 154(b) by 0 days.

(21) Appl. No.: 18/580,577

(22) PCT Filed: Jul. 16, 2022

(86) PCT No.: PCT/IB2022/056564
§ 371 (c)(1),
(2) Date: Jan. 18, 2024

(87) PCT Pub. No.: WO2023/002328
PCT Pub. Date: Jan. 26, 2023

(65) Prior Publication Data
US 2024/0380362 A1      Nov. 14, 2024

(30) Foreign Application Priority Data
Jul. 19, 2021    (CH) ............................... 070075/2021

(51) Int. Cl.
| | |
|---|---|
| *H02S 40/36* | (2014.01) |
| *B60L 53/30* | (2019.01) |
| *B60L 53/51* | (2019.01) |
| *H02S 20/21* | (2014.01) |
| *E04H 6/02* | (2006.01) |

(52) U.S. Cl.
CPC .............. *H02S 40/36* (2014.12); *B60L 53/30* (2019.02); *B60L 53/51* (2019.02); *H02S 20/21* (2014.12); *E04H 6/025* (2013.01)

(58) Field of Classification Search
CPC ......... H02S 20/00–32; H02S 30/00–20; H02S 40/30–38
USPC .................................................. 136/243–265
See application file for complete search history.

(56) References Cited

U.S. PATENT DOCUMENTS

| | | | | |
|---|---|---|---|---|
| 2011/0303262 A1* | 12/2011 | Wolter | .................... | H10F 19/90 |
| | | | | 136/251 |
| 2013/0075152 A1* | 3/2013 | Mazzone | ................. | H02G 3/04 |
| | | | | 174/481 |

FOREIGN PATENT DOCUMENTS

| | | | | | |
|---|---|---|---|---|---|
| AT | 523164 B1 | * | 6/2021 | ................ | F16B 9/00 |
| CN | 212656623 U | * | 3/2021 | | |
| DE | 202021100706 U1 | * | 4/2021 | ............ | H02S 10/00 |
| EP | 3617406 A1 | | 3/2020 | | |
| JP | 2002076416 A | * | 3/2002 | | |
| JP | 2004335903 A | * | 11/2004 | | |

(Continued)

OTHER PUBLICATIONS

JP-2004335903-A English (Year: 2004).*

(Continued)

*Primary Examiner* — Bach T Dinh
(74) *Attorney, Agent, or Firm* — BLANK ROME LLP

(57) ABSTRACT

A modular photovoltaic system comprises flat modules with two photovoltaic panels—preferably bifacial—arranged vertically in a rectangular frame consisting of two posts and two crossbeams. One of the crossbeams supports a cable guiding device for electrically connecting an adjacent photovoltaic module. The modules also have a charging socket for electric vehicles and can be used advantageously for the construction or conversion of parking spaces for vehicles.

10 Claims, 4 Drawing Sheets

(56)           References Cited

FOREIGN PATENT DOCUMENTS

| KR | 101220242 | B1 | * | 1/2013 |
| WO | 2009158715 | A2 | | 12/2009 |

OTHER PUBLICATIONS

DE-202021100706-U1 English (Year: 2021).*
KR-101220242-B1 English (Year: 2013).*
CN-212656623-U English (Year: 2021).*
AT-523164-B1 English (Year: 2021).*
JP-2002076416-A English (Year: 2002).*
International Search Report and Written Opinion for PCT/IB2022/
056564, mailed Oct. 25, 2022, 10 pages.

* cited by examiner

MODULAR PHOTOVOLTAIC SYSTEM

RELATED APPLICATIONS

This application is a national phase of PCT/IB2022/056564, filed on Jul. 16, 2022, which claims priority to CH Application No. CH070075/2021, filed on Jul. 19, 2021. The contents of these applications are hereby incorporated by reference in their entirety.

TECHNICAL FIELD

The present invention relates to a modular system for easily designing, producing, modifying, installing and servicing photovoltaic systems.

PRIOR ART

Photovoltaic installations are already assuming significant importance and the number of same is constantly growing thanks, amongst other things, to the ever decreasing price of silicon photovoltaic panels. Nevertheless, solar installations are still visually imposing and occupy large surface areas. Apart from on roofs, it is difficult to find locations capable of accommodating new installations.

These disadvantages may be overcome by multipurpose photovoltaic installations that combine other functions with the production of energy. This is sometimes required by law and local regulations. There is therefore a need for a solar product allowing realisation of efficient and economical solar installations.

Photovoltaic installations intended to be multipurpose do, however, face special challenges, for example:

The installations need to be able to withstand the rigours of the climate, especially in alpine and mountain regions.

The ideal location is often inaccessible to heavy transport and lifting means.

The visual impact needs to be reduced, particularly in locations intended to attract tourism.

The installation needs to be capable of managing uneven insolation of the panels.

Laying electric cables is expensive.

Document DE 202021100706 U1 is known from the prior art and discloses modular photovoltaic panels having two vertical posts connected by a single crossbeam substantially at mid-height.

Document EP 3617406 A1 discloses gantries straddling wheels. The gantries support, at height, horizontal photovoltaic panels and signaling elements. This system can be used for recharging electric vehicles and the gantries are electrically connected by catenary cables.

WO 2009/158715 discloses a photovoltaic module for installing on horizontal surfaces, comprising an electrical-interconnection channel built into the frame.

BRIEF SUMMARY OF THE INVENTION

There is therefore a need for a solar product that can be used for creating solar installations efficiently, without the need to resort to heavy transport and lifting means, and that allows multipurpose use with low installation costs.

These objectives are achieved by the subject matter of the attached claims and notably by a modular product for producing photovoltaic installations, comprising a plurality of flat photovoltaic modules, each comprising two parallel posts connected to one another by a first crossbeam and by a second crossbeam which are arranged orthogonal to the posts, one, two or more photovoltaic panels-preferably bifacial panels-arranged vertically in a space delimited by the posts and the crossbeams, comprising a cable-guide device fixed parallel to the second crossbeam comprising an electrical circuit between the posts allowing electrical connection of an adjacent photovoltaic module.

The description and the claims employ the terms "vertical" and "horizontal" to indicate the usual orientation of the photovoltaic module once it has been installed.

As a preference, the posts each have a lower end for anchoring vertically in a foundation. It is also possible to conceive of installations in which the photovoltaic modules are arranged horizontally or sloping.

The dependent claims introduce advantageous but non-essential features of the invention such as, for example, the presence of an empty vertical slot between two photovoltaic panels, and the fact that the first crossbeam is interrupted at the site corresponding to the empty slot by a mobile element able to adopt a closed position for joining the first crossbeam together, and an open position that allows an identical or compatible second photovoltaic module to be slipped into the slot and the photovoltaic module and the second photovoltaic module to be connected in a cross shape. The slot may be provided symmetrically in the middle of a module.

The mobile element enabling the slot to be opened and closed may be produced as an arm connected to the first crossbeam by a hinge at one end, allowing it to pivot vertically. The firmly joined-together nature of the crossbeam in the closed position may be provided by a bolted connection, by a latch bolt, or by some other appropriate device. The mobile element could also be configured to slide in the direction of the crossbeam, or else may be an entirely removable element secured to the crossbeam at both ends by bolts or by other removable fasteners.

Advantageously, the photovoltaic modules of the invention may include electronic energy management modules, for example optimizers or micro-inverters, and an electric vehicle charging terminal supplied via an electric circuit contained in the guide device. These elements may be housed in an empty space between the photovoltaic panels, if there is one, and covered by a cover.

According to one variant, the first crossbeam is positioned at the top and the second crossbeam at the bottom. Wood lends itself particularly well to the manufacture of the crossbeams and the vertical posts because it is lightweight and because it is recyclable.

The photovoltaic modules are preferably anchored by means of screw-in foundation elements which allow easy installation and reconfiguration with minimal environmental impact. As a preference, the posts are configured in such a way that they can easily be paired and joined together, thus creating even rows. There are numerous possible measures that can be taken in order to achieve this. As a preference, brackets may be provided at the bottom end of one of the posts, onto which brackets a post of an adjacent module can be fitted, using a single foundation element. Ties enable the modules to be joined together and can also be used as handles for transport. On uneven terrain, any measure may be taken in order to compensate for the differences in height between the feet of the posts, for example a system of custom-made spacers or jacks.

Advantageously, the modular product of the invention makes it possible to produce complex photovoltaic installations using a plurality of simple modules that are fairly lightweight so that they can be moved around and installed by one or two individuals without the need to resort to mechanical lifting gear. The electrical installation is also simplified by the presence of the pre-wired electric circuits and the energy management devices in the individual modules.

The product of the invention lends itself to a plurality of uses such as mazes, educational journeys, car parks and so on. The modules can be arranged in such a way as to create enclosed spaces for technical or hosting use, with a solar or conventional roof. The creation of solar car parks using the product of the invention is particularly advantageous thanks to the integration of the charging terminals and thanks to an efficient and inexpensive wiring solution. In that application, the product may be augmented by horizontal or sloping photovoltaic structures configured to provide shade to the parked vehicles.

BRIEF DESCRIPTION OF THE DRAWINGS

Examplary embodiments of the invention are indicated in the description which is illustrated by the attached figures in which.

EXEMPLARY EMBODIMENT(S) OF THE INVENTION

Figures 1, 2, 2A, 2B:
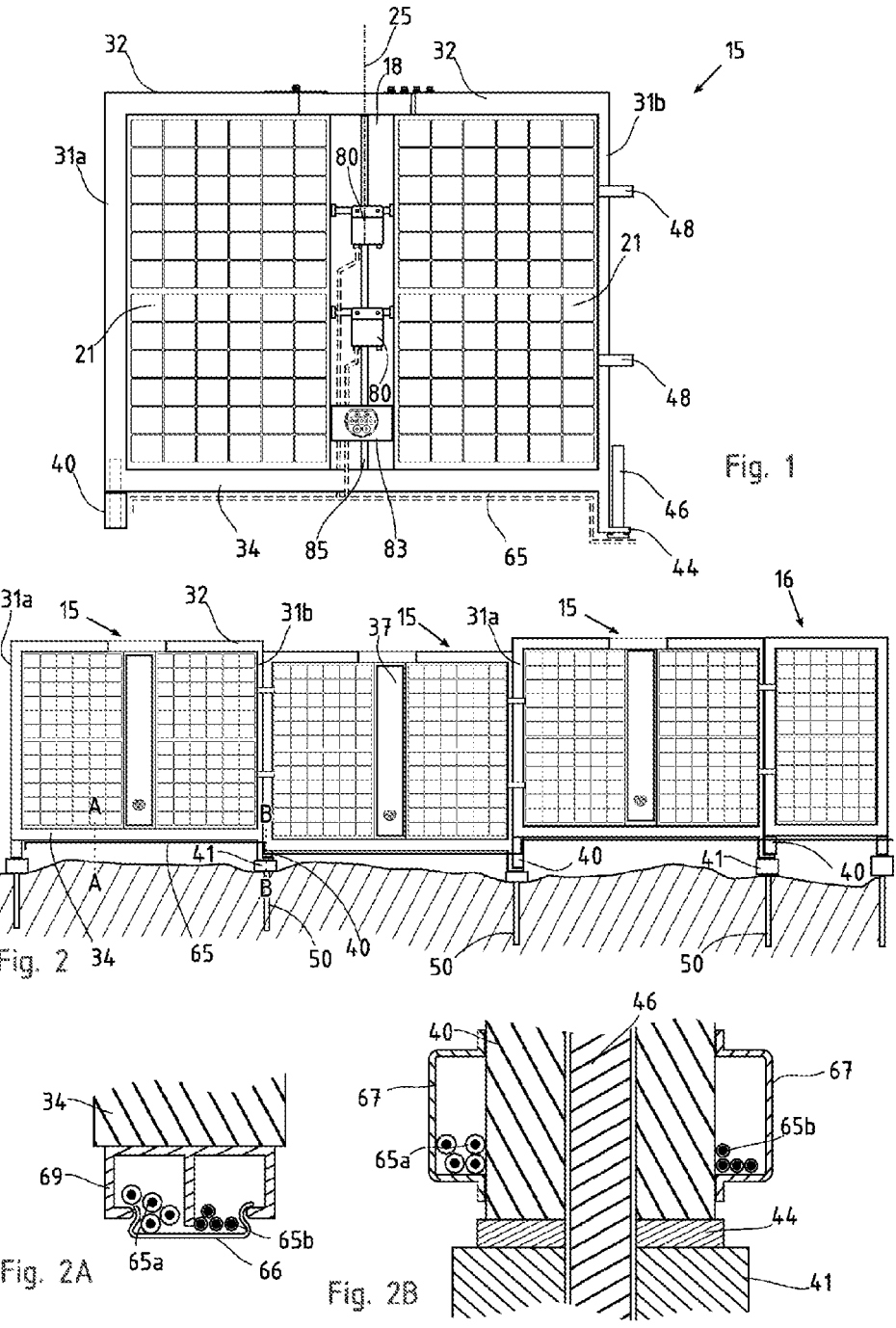
FIG. 1 illustrates a photovoltaic module according to the invention.
FIG. 2 illustrates three photovoltaic modules installed adjacent to one another
FIGS. 2A and 2B are two cross sections through the installation of FIG. 2, showing electric cable guide and management devices.

FIG. 1 shows a photovoltaic module 15 according to the invention, viewed from the front. The module comprises two vertical posts 31a, 31b which are connected by two crossbeams 32 and 34, one a top crossbeam, between the tops of the posts, and the other a bottom crossbeam, close to and parallel to the ground.

Two photovoltaic panels 21, are placed vertically in the space delimited by the posts 31a, 31b, the first crossbeam 32 and the second crossbeam 34, the photovoltaic panels preferably being bifacial, so that the photovoltaic module 15 is ready to generate electricity when installed vertically.

The photovoltaic panels 21 are preferably separated in the middle by an empty space 18, essentially aligned with a vertical axis 25 equidistant from the posts 31a, 31b. It is also possible to conceive of variants in which the slot 18 is not centered symmetrically between the posts, for example variants with a slot alongside one of the two posts.

The empty space 18 between the panels, if present, is able to house energy management devices 80, such as optimizers or micro-inverters. This is because in a multipurpose photovoltaic installation, it is not possible to ensure that all of the photovoltaic panels will receive the same solar radiation. It is advantageous for each panel to have its own management devices 80 configured to transmit the energy generated to a common circuit in an optimal manner, even when some of the panels are not illuminated as strongly, or are even shaded. It is also possible to use the space 18 between the solar panels to house other technical elements, such as a battery charging connector 83.

Although advantageous, it is not absolutely essential to provide an empty space between two photovoltaic panels. The invention also comprises variants without empty spaces, or with an empty space adjacent to one of the posts 31a, 31b. The number of photovoltaic panels per module is likewise not limited to two: each module may comprise one, two, three, four or any number of photovoltaic panels. The management devices 80 and/or the charging connector 83 may be fixed to one of the posts 31a, 31b or to one of the crossbeams 32, 34 for example.

In situations in which the illumination is optimal and the modules are positioned in such a way as to avoid shading effects, it might be possible, in the known way, to simplify the installation and use a lower number of optimizers and/or inverters, each serving several photovoltaic modules connected in series and/or in parallel.

The empty space 18 between the panels may also be used for other devices, for example information panels, communications devices, energy meters or the like, as required.

The management devices 80 are preferably mounted on removable mounting bars 85 or some other removable support, and can be moved around during installation. As will be seen later, this, in certain variants of the invention, allows two identical or compatible modules to be interleaved in a cross shape. The dimensions of the module may vary as required. Typically, the width of a photovoltaic module 15 may be 2.4 m, of which 0.3 is occupied by the central slot 18.

The module 15 also comprises a pre-installed electric circuit 65 extending from one post to another, so that a plurality of juxtaposed compatible modules can be connected easily. The electric circuit 65 preferably runs along the second, bottom, crossbeam 34.

FIG. 2A shows a cable guide and management system incorporated into the crossbeam 34, consistent with section A-A of FIG. 2. A guide 69, preferably made of metal, is fixed beneath the crossbeam 34 and guides the conductors 65a, 65b from one end of this crossbeam to the other. Longitudinal partitions may be provided in order to separate the cables according to their function or according to their voltage, for example 240 V AC cables and low-voltage DC cables, or communications cables. The number of compartments and of partitions is not limited. A blanking cover 66 provides access, for example in order to allow maintenance operations.

Between two photovoltaic modules 15, the conductors 65a, 65b are covered by covers 67, preferably made of metal, visible in FIG. 2B, consistent with section B-B in FIG. 2. The covers 67 protect and hide the cables 65a and 65b and are fixed removably to the top spacers 40. The connection between one module and another may anticipate connectors in the covers 67 or in the guide 69. Separation between circuits at the post may be achieved by using the two sides, front/rear, as illustrated, or through the use of partitions.

The posts are configured to connect to the posts of identical or compatible modules in order to form rows. In the variant depicted, the post 13b (on the right in the figure) comprises a bottom bracket 44 with a vertical spindle 46. The spindle 46 is configured to engage in a cavity of corresponding shape in the post 13a of another photovoltaic module. The collars 48 can be used to secure the modules to one another and can also act as lifting handles.

FIG. 2 illustrates a row of three photovoltaic modules 15 of the same dimensions, and an extension module 16 of lesser width, all connected to one another as described hereinabove. The slots 18 housing the management modules 80 are covered by covers 37 which serve to protect and hide the modules 80, and may also perform an antinoise function. In this application which does not anticipate any cross-shaped connections, the central electrical elements 80 and the covers 37 may be entirely pre-fitted. In the example illustrated, the covers 37 have openings to allow the use of charging connectors.

Spacers 40, 41 above and below the brackets 44 are used to compensate for the unevenness of the land. As a preference, the bottom spacers 41 also incorporate a conduit for the above-mentioned electric circuit 65. Advantageously, two juxtaposed posts share the one same common foundation 50. Foundations screwed directly into the ground, made of concrete, or any appropriate foundation means, may be employed.

Figure 3:
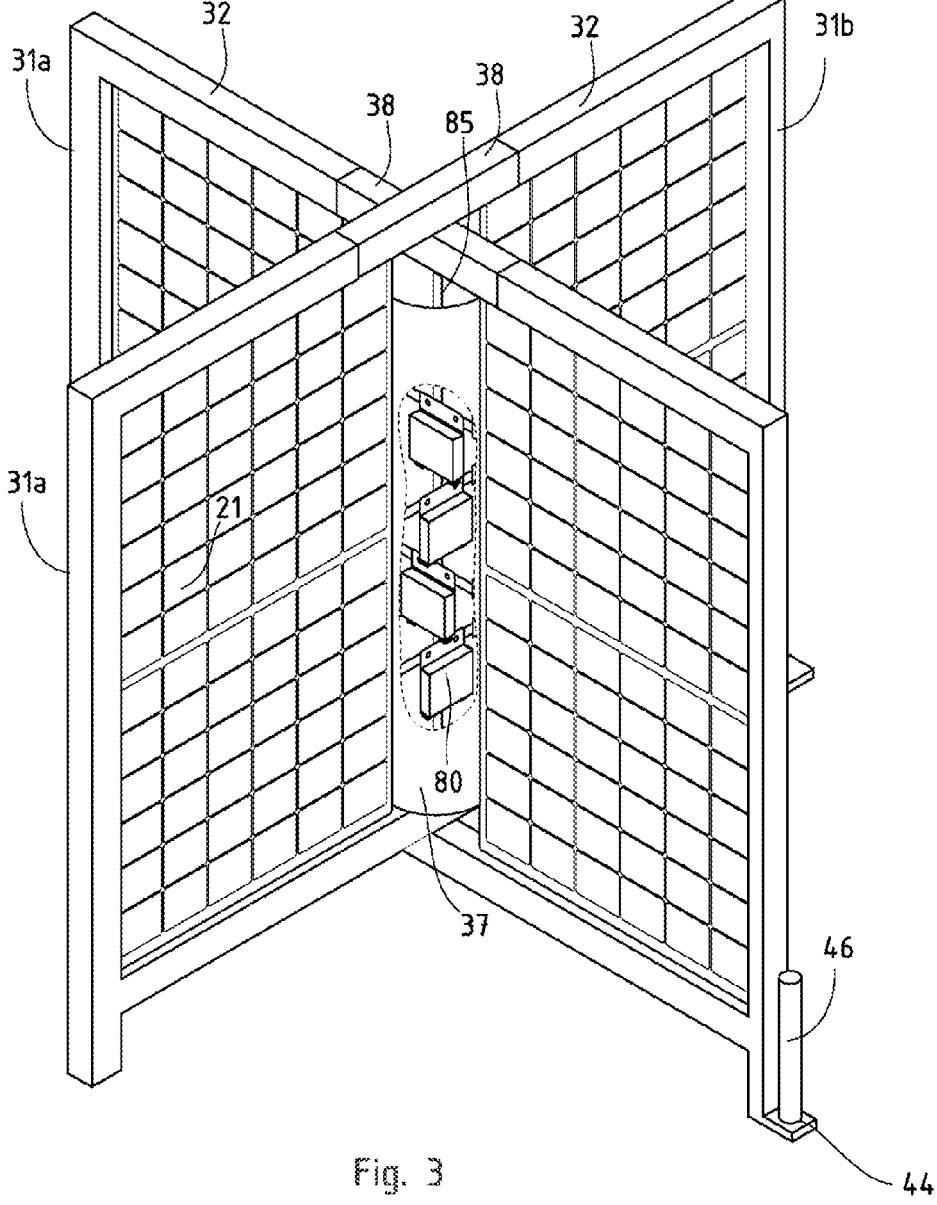
FIG. 3 shows two photovoltaic modules assembled and joined together in a cross shape.

FIG. 3 shows two identical photovoltaic modules joined together in a cross shape. The cylindrical cover 37 is partially transparent so that the energy management modules 80 inside can still be seen. In this case, the mounting bars 85 and the cover 37 are removable, so that the electrical devices 80 can be installed only after the modules 15 have been connected in a cross shape, in the central empty space.

Figure 4:
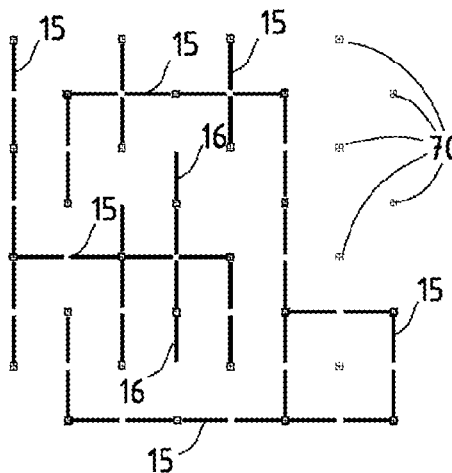
FIGS. 4-6 schematically illustrate, viewed from above, an area of land prepared for the installation of a modular photovoltaic system according to one aspect of the invention, and three possible layouts for photovoltaic modules on this area of land.
Figure 5:
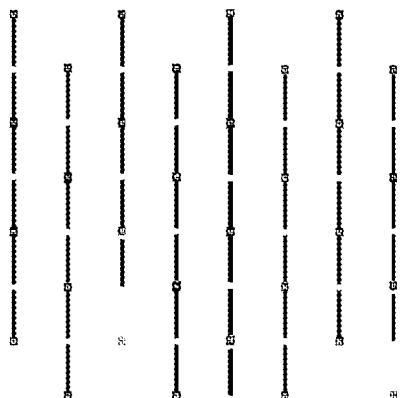
Figure 6:
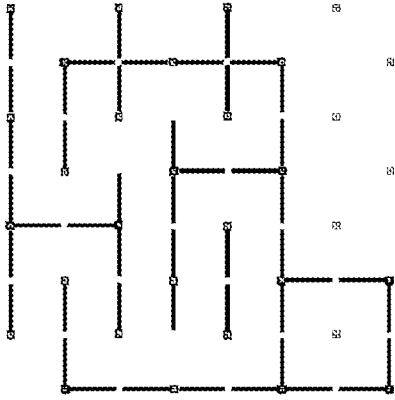

FIGS. 4 to 6 show three possible layouts for a set of photovoltaic modules on the one same area of land, in three configurations. A uniform network of foundation elements 70 is created in the area of land beforehand. The foundations 70 are arranged in the land in a quincunx pattern (namely a regular square network inclined by 45°), the spacing between two vertically-aligned or horizontally-aligned foundations corresponding to the distance between the posts 31*a*, 31*b* of a basic module. This layout is advantageous because it allows a multitude of arrangements to be achieved without creating new foundations, but it is not the only possibility.

The photovoltaic modules 15 and 16 of the invention are arranged in the foundations in such a way as to create the desired structure, for example a maze for fun activities, and a closed ancillary zone. Foundations that are not used may be capped off. The cross-shaped structure provides greater resistance to lateral thrust, for example caused by the wind or the snow.

FIGS. 5 and 6 show other layouts of the same photovoltaic modules on the same area of land. The straight rows in FIG. 5 make for ease of maintenance, for example mowing, whereas the arrangement of FIG. 6 is a plot obtained using the same modules as FIG. 4 but with a number of variations in order to give the users a more diverse experience.

Figure 7:
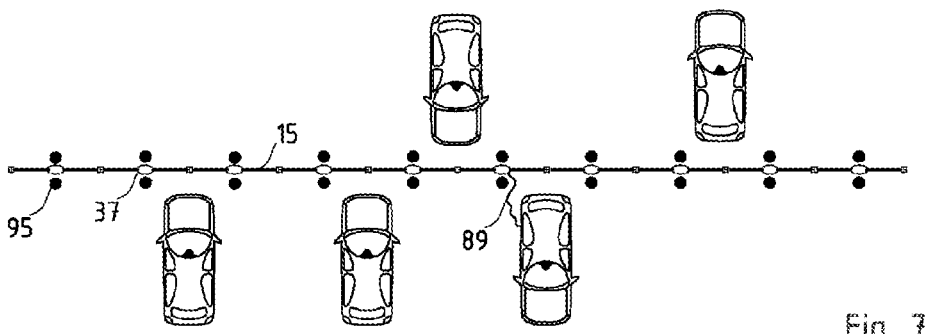
FIG. 7 illustrates a use of the modular photovoltaic system of the invention in a car park for vehicles.

In an advantageous variant, the width of the photovoltaic modules is compatible with the standardized sizings of car parking bays so as to be able to create "solar car parks" as illustrated in FIG. 7. The photovoltaic modules may house, behind the covers 37 and in addition to the charging terminals, also parking meters or communications devices. Protective devices 95, for example bollards, planters or embankments, may be provided, as required, to prevent vehicles from colliding with the solar installation. Vehicles parking in the car park may connect to the charging terminals using flexible cables 89 in the conventional way, and thus recharge their batteries.

Importantly, the photovoltaic modules of the invention allow the parking spaces to be wired using the circuit 65 built into their structure, thus avoiding the need to lay underground cables. The photovoltaic modules of the invention can also be used to set out a parking area by making it follow the lines of the parking bays already marked out. Using the modules of the invention a traditional car park can be converted into an electric car park without digging trenches for the passage of electric cables and above all while exploiting the solar potential of the car park.

Figure 8:
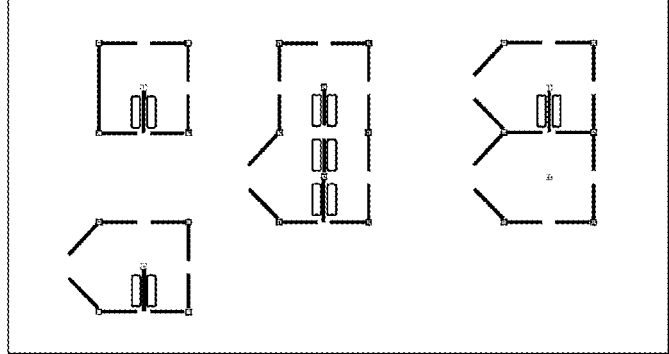
FIGS. 8-9 illustrate enclosed spaces produced using the modular photovoltaic system of the invention.
Figure 9:
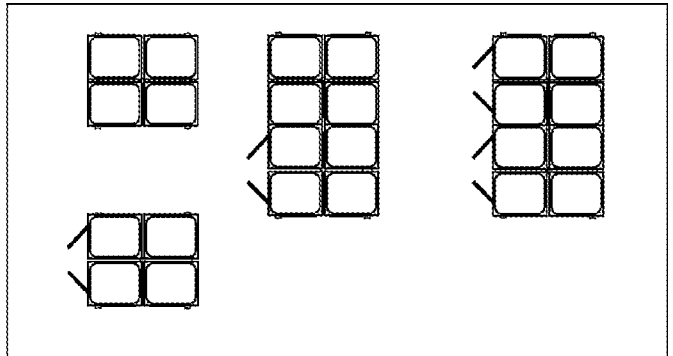

The photovoltaic modules of the invention can be used to create closed spaces, accessible by opening doors in one or more walls, as visible in FIGS. 8 and 9. These spaces may act as plant-room areas, for example for connection to an electricity distribution network, to house the inverters and also to act as hosting, play, or storage spaces and so on. These spaces may be covered with solar panels, as illustrated in FIG. 9, or with conventional roofing.

In the car park embodiment, the photovoltaic modules may also be used to create horizontal or sloping projecting shading structures in order to protect the vehicles from the rays of the sun and increase the harvesting of photovoltaic energy.

The basic module 15 and the extension module 16 have been described here by way of example. However, the invention is not restricted to these special embodiments but includes all variants and equivalents implied by the attached claims. Amongst other things, the system of the invention may include, in addition to the basic modules having two photovoltaic panels, also modules in which one or two upper panels are replaced by passive elements, by wood panels, or by advertising hoardings. Depending on the opportunities presented, it might also be possible to conceive of modules having three, four or more photovoltaic panels. The invention could also provide modules with a roof, as well as many other variants.

REFERENCE NUMERALS USED IN THE FIGURES

15 photovoltaic module
16 smaller module
18 space, slot
21 photovoltaic panel
25 vertical axis
31*a,b* post
32 first crossbeam
34 second crossbeam
37 cover
40 top spacer
41 bottom spacer
44 bracket
46 spindle
48 collars
50 screw foundation
65 electric circuit
65*a* cables
65*b* cables
66 blanking cover
67 cover
69 cable guide
70 foundation
80 energy management device
83 charging terminal
85 support
89 charging cable

The invention claimed is:

1. A modular product for producing photovoltaic installations, comprising a plurality of flat photovoltaic modules, each photovoltaic module comprising two parallel and vertical posts connected to one another by a first crossbeam and by a second crossbeam which are arranged orthogonal to the posts, one, two or more photovoltaic panels arranged vertically in a space delimited by the posts and the crossbeams, wherein the first crossbeam is positioned at the top of the photovoltaic module above the photovoltaic panels and the second crossbeam is positioned at the bottom of the module, below the photovoltaic panels, comprising a horizontal cable-guide device fixed to the second crossbeam below said second crossbeam, comprising an electrical circuit between the posts allowing electrical connection of an adjacent photovoltaic module, wherein the photovoltaic modules have an empty space between two photovoltaic panels and wherein the space of a first photovoltaic module is aligned with a vertical axis equidistant from the posts and is able to accommodate an identical or compatible second photovoltaic module forming a right angle with the first photovoltaic module.

2. The modular product of claim 1, the photovoltaic modules comprising electronic energy management modules and/or a vehicle charging terminal powered by an electric circuit contained in the guide device.

3. The modular product of claim 2, wherein the electronic energy management modules and/or the charging terminal are housed in an empty space between two photovoltaic panels and covered by a cover.

4. The modular product of claim 1, the posts each having a lower end for anchoring vertically in a foundation.

5. The modular product of claim 1, wherein the photovoltaic panels are vertical and bifacial.

6. The modular product of claim 1, wherein the crossbeams and the posts are made of wood.

7. The modular product of claim 1, wherein one of the posts at its bottom end bears a bracket and ties enabling the photovoltaic module to be secured to an identical or compatible adjacent photovoltaic module.

8. The modular product of claim 1, comprising a plurality of photovoltaic modules arranged adjacent to vehicle parking spaces.

9. The modular product of claim 8, comprising horizontal or sloping photovoltaic modules configured to provide shade for the parked vehicles.

10. A method for converting a car park in order to add an electric vehicle charging function, comprising the installation of photovoltaic modules as claimed in claim 1 along lines that mark out parking bays.

* * * * *